US 6,630,017 B2

(12) United States Patent
Ma et al.

(10) Patent No.: US 6,630,017 B2
(45) Date of Patent: *Oct. 7, 2003

(54) INKSET FOR GRAPHIC ART INK JET IMAGE PRINTERS

(75) Inventors: Zeying Ma, San Diego, CA (US); Kai Kong Iu, San Diego, CA (US); Rodney D. Stramel, San Diego, CA (US); Shunqiong Yue, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 09/813,516

(22) Filed: Mar. 21, 2001

(65) Prior Publication Data

US 2003/0019395 A1 Jan. 30, 2003

Related U.S. Application Data

(63) Continuation of application No. 09/540,102, filed on Mar. 31, 2000, now Pat. No. 6,436,180.

(51) Int. Cl.[7] .............................................. C09D 11/02
(52) U.S. Cl. ................................ 106/31.59; 106/31.58; 106/31.86; 106/31.89
(58) Field of Search ........................... 106/31.59, 31.58, 106/31.89, 31.86

(56) References Cited

U.S. PATENT DOCUMENTS

| | | | |
|---|---|---|---|
| 4,963,189 A | 10/1990 | Hindagolla | 106/31.52 |
| 5,085,698 A | 2/1992 | Ma et al. | 106/31.6 |
| 5,221,334 A | 6/1993 | Ma et al. | 106/31.6 |
| 5,302,197 A | 4/1994 | Wickramanayke et al. | 106/31.46 |
| 5,725,641 A | 3/1998 | MacLeod | 106/31.5 |
| 5,788,750 A * | 8/1998 | Gundlach et al. | 106/31.27 |
| 5,788,754 A * | 8/1998 | Deardurff et al. | 106/31.58 |
| 5,851,273 A | 12/1998 | Morris et al. | 106/31.27 |
| 5,858,075 A * | 1/1999 | Deardurff et al. | 106/31.27 |
| 6,004,389 A * | 12/1999 | Yatake | 106/31.86 |
| 6,050,676 A | 4/2000 | Sugimoto et al. | 347/43 |
| 6,261,350 B1 * | 7/2001 | Kabalnov | 106/31.33 |
| 6,436,180 B1 * | 8/2002 | Ma et al. | 106/31.59 |

OTHER PUBLICATIONS

Inventors: Zeying Ma, et al, Title: Color Ink Composition for Graphic Art Ink Jet Image Printers, Filing Date: Mar. 31, 2000, Ser. No. 09/540,102, Title page plus 21 pages, Attorney Docket No. 10991630–1.

* cited by examiner

Primary Examiner—Helene Klemanski
(74) Attorney, Agent, or Firm—Michael D. Jones

(57) ABSTRACT

An ink jet inkset is provided for image printers, in particular large format printers, for printing on both porous, non-porous, and hybrid glossy media. The inket contains a black ink and one or more color inks, said color ink composition comprises at least one water-soluble dye and a vehicle comprising at least one co-solvent and at least two different surfactants, a non-ionic surfactant and a fluoro-surfactant. The total surfactant concentration ranges from about 0.05 to 6 wt % of the ink composition. The non-ionic surfactant is present in a range of about 0.05 to 3 wt % of the ink composition, while the fluoro-surfactant is present in a range of about 0.001 to 3 wt % of the ink composition. The ink formulation that works well with porous, non-porous, and hybrid glossy media and provides substantially instant ink drying and light fastness of the ink. Further, the ink formulation evidences excellent image quality. The ink can also pass harsh pen material compatibility tests. The ink does not puddle on the surface of the orifice plate in the default pen, yet has low viscosity. The ink is excellent in pen reliability such as long decap time, no decel, no kogation, and good drop directionality.

22 Claims, No Drawings

INKSET FOR GRAPHIC ART INK JET IMAGE PRINTERS

This application is a continuation and is related to the subject matter disclosed in Ser. No. 09/540,102, filed Mar. 31, 2000, now U.S. Pat. No. 6,436,180, by Ma et al., dated Apr. 20, 2002, entitled "Color Ink Composition for Graphic Art Ink Image Printers". This application is a continuation U.S. Pat. No. 6,436,180, which was co-pending at the time of this application's filing date.

TECHNICAL FIELD

The present invention is directed to non-impact printers, more particularly, to an inkset containing a black ink jet ink composition for such printers. Specifically, this invention is directed to large format image printers.

BACKGROUND ART

An image printer of high throughput requires, among other things, fast-drying glossy media. By "image printer" is typically meant graphic art, including photographic prints, printed on media widths ranging from 4 to 60 inches. In some printers, the media width may be varied, while in others, it may be fixed. Examples of such image printers include Hewlett-Packard's DesignJet series (2000, 2500CP, 2800, 3500CP, 3800, 5000, 5000PS); an example of a glossy media printer includes Hewlett-Packard's Photosmart Printer. The HP Deskjet 2K series can print on media widths of 35 inches, the 3K series can print on media widths of 54 inches, and the 5K series can print on media widths of 42 and 60 inches. The aforementioned printers print on glossy media, among others.

While glossy media evidencing fast ink drying are required, such media are porous and poor in lightfastness. To meet the broad range of customer needs, a media of good lightfastness is also necessary.

A number of inks have been previously disclosed and claimed; see, e.g., U.S. Pat. No. 5,851,273, entitled "Dye Set for Improved Ink-Jet Print Quality", issued on Dec. 22, 1998, to Peter C. Morris et al; U.S. Pat. No. 5,788,754, entitled "Ink-Jet Inks for Improved Image Quality", issued on Aug. 4, 1998, to Larrie A. Deardurff et al; and U.S. Pat. No. 5,858,075, entitled "Dye-Set for Improved Ink-Jet Image Quality", issued on Jan. 12, 1999, to Larrie A. Deardurff et al, all assigned to the same assignee as the present application. The inks of the first patent are employed in the DesignJet printer, while the inks of the last two patents are employed in the Photosmart Printer.

The inks disclosed and claimed in the foregoing patents provide excellent image quality on non-porous glossy media such as Hewlett-Packard's High Gloss Photopaper C6026A. However, these inks do not perform as well with porous glossy media, nor on hybrid glossy media (a combination of porous and non-porous), such as Hewlett-Packard's Photopaper C6959. Hybrid glossy media exhibit short dry times and good light fastness.

On the other hand, other Hewlett-Packard inks that are good for porous glossy media do not print as well on the non-porous glossy media.

Other issues constantly associated with the ink for imaging are pen material compatibility and puddling. Because aggressive surfactants are needed for better image quality, the ink often causes delamination or detachment of pen components. Puddling on the printhead surface is a big concern for ink jet printing. Problems caused by puddling include drop mis-directionality, massive ink accumulation on the nozzle (orifice) plate, pen service difficulties, and increased ink contact/attack of pen components.

Typically, ink flow channel design and firing chamber architecture are designed to modulate puddling. Damped architecture can control puddling by the reduction of ink refill speed. However, that may add a negative effect on firing frequency response. In addition, damped architecture could add more difficulties for pen manufacturing.

Another approach is to increase the viscosity of ink. This could be realized by adding a high molecular weight surfactant/oligomer/polymer. Using viscous co-solvent or increasing the total organic content can also raise ink viscosity. However, image quality, defined by ink/media interaction, would not be optimal.

Thus, an inkset is required that eliminates, or at least minimizes, the foregoing problems, while providing improved image quality print on porous, non-porous, and hybrid porous glossy media, consistent with high throughput.

DISCLOSURE OF INVENTION

In accordance with the present invention, an ink jet inkset is provided for image printers for printing on porous, non-porous, and hybrid glossy media. The color ink compositions comprise at least one water-soluble dye and a vehicle comprising at least one co-solvent and at least two different surfactants, a non-ionic surfactant and a fluoro-surfactant. The black ink can have an alternative formulation without the presence of the fluoro-surfactant.

The total surfactant concentration ranges from about 0.05 to 6 wt % of the ink composition. The non-ionic surfactant is present in a range of about 0.05 to 3 wt % of the ink composition, while the fluoro-surfactant is present in the color inks in a range of about 0.001 to 3 wt % of the ink composition.

Because of differing needs in the ink formulations, it has been found that an alternative ink composition with the black colorant can be used along side the above mentioned color inks. So while the color ink compositions should be formulated to decrease puddling and help coalescence, the black ink composition can be formulated without these limits. Additionally, the black ink are formulated at a higher surface tension than the color inks; thus providing for better reliability without the presence of fluorosurfactants, like in the color inks.

The present invention provides an inkset that works well with porous, non-porous, and hybrid glossy media. A printer, such as the DesignJet 5000PS that accomodates the hybrid glossy media will provide the customer with substantially fast ink drying while maintaining the light fastness of the ink, compared to prior art inks.

The inks of the present invention evidence excellent image quality. The inks can also pass harsh pen material compatibility tests. The inks do not puddle on the surface of the orifice plate in the default pen, yet have low viscosity. The color inks have a surface tension in the range of from about 14 to about 24 dyne/cm, preferably from about 16 to about 23 dyne/cm. The black inks useful herein have a surface tension in the range of from about 25 to about 43 dyne/cm, preferably from about 27 to about 35 dyne/cm. The differing surface tension of the inks allow for excellent pen reliability such as long decap time (greater than 30 sec), no decel, no kogation, and good drop directionality. The term "decap time" refers to the time required for ink to crust in the nozzles of the pen; a long decap time is desired. By "decel"

is meant that the velocity of ink drops decreases with time during continuous firing of the pen, and is an undesirable property.

BEST MODES FOR CARRYING OUT THE INVENTION

The invention described herein is directed to improved inks for printing inkjet images using commercially-available ink-jet printers such as the DeskJet ® family of printers, manufactured by Hewlett-Packard Company, Palo Alto, Calif. The inks of the present invention can produce true colors on a variety of glossy media, whether porous, non-porous, or hybrid, with high throughput and high lightfastness.

The inks of the present invention include black, yellow, cyan, and magenta inks containing a black dye, yellow dye, a cyan dye, and one or two magenta dyes, respectively. In particular, the yellow dye is Direct Yellow 132, the cyan dye is Direct Blue 199, and the magenta dye is Magenta 377 (Ilford AG, Switzerland), alone or together with Acid Red 52. These dyes are all anionic dyes and are associated with a sodium counterion.

The present yellow, cyan, and magenta aqueous ink compositions each comprise in general from about 0.1 to 10 wt % of the dye (or dyes) and a vehicle comprising the following components (in wt % of the total ink composition): about 3 to 40 wt %, preferably about 5 to 20 wt %, and most preferably about 13 to 15 wt % of at least one water-miscible organic co-solvent; about 0.05 to 6 wt % of a surfactant mixture comprising at least one non-ionic surfactant and at least one fluoro-surfactant; 0 to about 5 wt % of at least one component independently selected from the group consisting of buffers, biocides, and metal chelators; and the balance water. In an alternate embodiment, the surfactant mixture comprises at least three surfactants: the non-ionic surfactant, an anionic surfactant, and the fluoro-surfactant, which may be non-ionic or anionic.

The present black aqueous ink composition comprises in general from about 0.1 to 10 wt % of the dye (or dyes) and a vehicle comprising the following components (in wt % of the total ink composition): about 3 to 40 wt %, preferably about 5 to 20 wt %, and most preferably about 13 to 15 wt % of at least one water-miscible organic co-solvent; about 0.05 to 6 wt % of one or more surfactants; 0 to about 5 wt % of at least one component independently selected from the group consisting of buffers, biocides, and metal chelators; and the balance water. The black inks of this invention have a higher surface tension than those of the color inks.

In the practice of the present invention, each ink color, namely, cyan, yellow, and magenta, can comprise more than one dye load. That is, there can be one or more ink-jet pens filled for each ink color, each pen having a different dye load or a different dye. For example, there can be two cyan pens, each one containing a different dye load and/or a different cyan dye.

All concentrations herein are in weight percent of the total ink composition, unless otherwise indicated. The purity of all components is that employed in normal commercial practice for ink-jet inks.

The yellow dye is Direct Yellow 132 (DY132), present in an amount of about 1 to 5 wt %, preferably about 2.5 to 3.5 wt %. In setting the concentration of the yellow dye, it is preferred that the ink has an absorbance (A) of from about 0.0833 to about 0.1547 at the lambda maximum of 400 nm for a 1:10,000 dilution.

The cyan ink is Direct Blue 199 (DB 199), present in an amount of about 0.1 to 5 wt %, preferably about 2.5 to 3.5 wt %. In setting the concentration of the cyan dye, it is preferred that the ink has an absorbance (A) of from about 0.07 to about 0.13 at the lambda maximum of 620 nm for a 1:10,000 dilution.

The magenta ink is a mixture of Magenta 377 (M377) (Ilford AG, Switzerland) and Acid Red 52 (AR52) and is present in a total amount of about 0.1 to 5 wt %, preferably about 2.5 to 3.5 wt %. In setting the concentration of the magenta dye, it is preferred that the ink has an absorbance (A) of from about 0.0553 to about 0.1027 at the lambda maximum of 520 nm for a 1:10,000 dilution of the M337 dye and an absorbance (A) of 0.0266 to about 0.0494 at the lambda maximum of 566 nm for a 1:10,000 dilution of the AR52 dye.

The black ink suitably employed in the practice of the present invention can be dye-based or pigment-based. The black ink can also be a composite of the three primary colors, yellow, cyan, and magenta. Suitable dye-based black inks are disclosed and claimed, for example, in U.S. Pat. No. 4,963,189, entitled "Waterfast Ink Formulations with a Novel Series of Anionic Dyes Containing Two or More Carboxyl Groups", issued on Oct. 16, 1990, to Suraj L. Hindagolla, and U.S. Pat. No. 5,725,641, entitled "Lightfast Inks for Ink-Jet Printing", issued on Mar. 10, 1998, to Cheryl A. MacLeod, both assigned to the same assignee as the present application.

Suitable black pigment-based inks are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks", all assigned to E. I. Du Pont de Nemours and Company. The preferred black dye is Pacified Reactive Black 31. This ink, which is dye-based, has an absorbance (A) of from about 0.084 to about 0.156 at the lambda maximum of 570 nm for a 1:10,000 dilution.

As indicated above, the inks of the present invention comprise about 5 to 20 wt % water-miscible organic co-solvent. More preferably, the inks comprise about 8 to 15 wt % organic co-solvent.

The water-miscible organic co-solvents suitably employed in the practice of the present invention include any of, or a mixture of two or more of, such compounds as nitrogen-containing ketones, such as 2-pyrrolidone, N-methyl-pyrrolid-2-one (NMP), 1,3-dimethylimidazolid-2-one, and octyl-pyrrolidone; diols such as ethanediols (e.g., 1,2-ethanediol), propanediols (e.g., 1,2-propanediol, 1,3-propanediol, 2-ethyl-2-hydroxymethyl-1,3-propanediol, ethylhydroxy-propanediol (EHPD)), butane-diols (e.g., 1,2-butanediol, 1,3-butanediol, 1,4-butanediol), pentanediols (e.g. 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); alcohols, such as $C_3$–$C_6$ alcohols (e.g., propanol, butanol, pentanol, and hexanol), including isomers thereof (e.g., 1-propanol and 2-propanol); glycol ethers and thioglycol ethers commonly employed in ink-jet inks, such as polyalkylene glycols such as polyethylene glycols (e.g., diethylene glycol (DEG), triethylene glycol, tetraethylene glycol), propylene glycols (e.g., dipropylene glycol, tripropylene glycol, tetrapropylene glycol), polymeric glycols (e.g., PEG 200, PEG 300, PEG 400, PPG 400), and thiodiglycol. Additional co-solvents include hydantoins (glycol ureas) and derivatives thereof, such as a hydantoin containing ethyl hydroxide and methyl groups, available from Lonza, Inc. as Dantocol DHE, and polyalkoxylated triols, such as Multranol 4012, which is a polyalkoxylated triol having a molecular weight of about 440, available from Bayer.

Preferably, the organic co-solvent comprises a mixture of 2-pyrrolidone and 1,6-hexanediol.

Buffers optionally employed in the practice of this invention to modulate pH can be organic-based biological buffers or inorganic buffer, preferably organic-based. Examples of buffers include tris(hydroxymethyl)aminomethane, available from companies such as Aldrich Chemical (Milwaukee, Wis.), 4-morpholineethanesulfonic acid (MES), and 4-morphonlinepropanesulfonic acid (MOPS).

Metal chelators optionally employed in the practice of this invention are used to bind transition metal cations that may be present in the ink. Examples of preferably-employed metal chelators include: EDTA, Diethylenetetraaminepentaacetic acid (DTPA), trans-1,2-diaminocyclohexanetetraacetic acid (CDTA), (ethylenedioxy) diethylene dinitrilotetraacetic acid (EGTA), malonic acid, salicylic acid, or other chelators that can bind transition metal cations.

Any of the biocides commonly employed in inkjet ink may optionally be employed in the practice of this invention, such as Nuosept 95, available from Huls America (Piscataway, N.J.); Proxel GXL, available from Zeneca (Wilmington Del.); and glutaraldehyde, available from Union Carbide Company (Bound Brook, N.J.) under the trade designation Ucarcide 250.

The color inks of the present invention further comprise a mixture of two or more surfactants, the total surfactant concentration ranging from about 0.05 to 6 wt %. The surfactant mixture comprises a non-ionic surfactant and a fluoro-surfactant. Alternatively, the surfactant mixture comprises a non-ionic surfactant, an anionic surfactant, and either a non-ionic or an anionic fluoro-surfactant.

The concentration of the non-ionic surfactant is in the range of about 0.5 to 3 wt % of the ink composition. One example of a suitable non-ionic surfactant includes the SURFYNOL series, which are acetylenic ethoxylated diols available from Air Products. Another example of a suitable non-ionic surfactant includes the TERGITOL series, which are polyethylene or polypropylene oxide ethers available from Union Carbide.

The concentration of the optional anionic surfactant is in the range of about 0.05 to 3 wt % of the ink composition. One example of a suitable anionic surfactant includes the DOWFAX series, which are diphenyl sulfonate derivatives available from Dow Chemical. Another example of a suitable anionic surfactant is the OT series, which are dioctyl sodium sulfosuccinates available from Cytec Ind.

Examples of suitable fluoro-surfactants include the ZONYL series, available from E. I. Du Pont de Nemours Company, and the FLUORAD series, available from 3M Company. The ZONYL fluoro-surfactants include $(R_FCH_2CH_2O)_xPO(O^-NH_4^+)y$, where $x+y=3$ and $R_F$ (FSP), FSP+hydrocarbon surfactant (FSJ), $R_FCH_2CH_2SO_3H$, $R_FCH_2CH_2SO_3^-NH_4^+$ (TBS), $C_6F_{13}CH_2CH_2SO_3H$, $C_6F_{13}CH_2CH_2SO_3^-NH_4^-$ (FS-62), $R_FCH_2CH_2SCH_2CH_2COO^-Li^+$ (FSA), $R_FCH_2CH_2O(CH_2CH_2O)_xH$ (FSO), and $R_FCH_2CH_2O(CH_2CH_2O)_yH$ (FSN). The moiety $R_F$ is $F(CF_2CF_2)_z$, where $z=1–7$ (FSP, FSJ, FSO) or 1–9 (TBS, FSA). The FLUORAD fluoro-surfactants include ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740).

Preferred fluoro-surfactants include ZONYL FSA, ZONYL FS-62, and FLUORAD FC-129.

The concentration of the fluoro-surfactant ranges from about 0.001 to 3 wt %, preferably from about 0.01 to 1 wt %, and most preferably from about 0.1 to 0.25 wt %. At a concentration less than about 0.001 wt %, the benefits afforded by the presence of the fluoro-surfactant are not realized, while a concentration greater than about 3 wt % is not soluble in the ink.

The anionic and non-ionic surfactants, in combination with the co-solvent(s), serve to reduce dry time and increase media throughput and are compatible with the glossy media, whether porous, non-porous, or hybrid. The fluoro-surfactant reduces puddling of the ink-jet ink on the nozzle plate. As a result, the pen orifice plate is cleaner. Better drop directionality and better serviceability are obtained. Because of less ink build-up on the print head, cross-contamination between colors is reduced.

As an example, an ink formulation containing 0.2 wt % FLUORAD FS-62 can control puddling and allow the ink to have a low viscosity (1.5 to 2.0 cps). Normally, for puddling benefit, an ink viscosity of above 3.0 is preferred.

The low viscosity ink provides fast penetration rate on glossy media. As a result, coalescence is minimized and image quality is improved. The fast penetrating ink is more media independent and works well for more than one glossy media. The fluoro-surfactant also provides excellent bleed control.

Due to the effectiveness of the fluoro-surfactant on puddling control, ink formulation freedom is expanded. Surfactants or solvents that are poor in puddling performance can be reconsidered and, indeed, can be used in combination with the fluoro-surfactant.

EXAMPLES

Example 1

An example of an ink-jet ink composition in accordance with the present invention is listed in Table I below. Table I lists the compositions for the color inks, yellow, cyan, and magenta, and for the color inks having reduced dye load, light cyan (20%) and light magenta (20%). The black ink employed contained Pacified Reactive Black 31, which has an absorbance (A) of 0.12 at 1:10,000 dilution.

TABLE I

Ink Formulation.

| Component/Color | Cyan | Magenta | Yellow | Light C | Light M |
|---|---|---|---|---|---|
| Metal Chelator | 0.1 wt % | 0.1 wt % | 0.1 wt % | 0.1 wt % | 0.1 wt % |
| Biocide | 0.15 wt % | 0.15 wt % | 0.15 wt % | 0.15 wt % | 0.15 wt % |
| FLUORAD FS-62 | 0.18 wt % | 0.18 wt % | 0.18 wt % | 0.8 wt % | 0.18 wt % |
| DOWFAX 2A1 | 0.32 wt % | 0.32 wt % | 0.32 wt % | 0.32 wt % | 0.32 wt % |
| SURFYNOL CT-111 | 0.16 wt % | 0.16 wt % | 0.16 wt % | 0.16 wt % | 0.16 wt % |
| Alkane Diol | 9 wt % | 9 wt % | 9 wt % | 9 wt % | 9 wt % |
| Nitrogen Heterocyclic Ketone | 4 wt % | 4 wt % | 4 wt % | 4 wt % | 4 wt % |
| Na-DB199 @ 1/10K | A = 0.10 | | | 20% of C | |
| Na-M377 @ 1/10K | | A = 0.079 | | | 20% of M |

TABLE I-continued

Ink Formulation.

| Component/Color | Cyan | Magenta | Yellow | Light C | Light M |
|---|---|---|---|---|---|
| Na-AR52 @ 1/10K | | A = 0.038 | | | 20% of M |
| Na-DY132 @ 1/10K | | | A = 0.119 | | |
| DDI Water | Balance | Balance | Balance | Balance | Balance |
| Total | 100 wt % | 100 wt % | 100 wt % | 100 wt % | 100 wt % |

DDI water is distilled deionized water.
pH adjusted with KOH for the vehicle to 7.2 to 7.3.
pH adjusted with KOH or $HNO_3$ for final ink to 7.5 to 7.6.
Absorbance (A) spectra were measured on a Hewlett-Packard 8453 spectrophotometer at 1:10,000 dilution ("1/10K").

TABLE I

Black Ink Formulation.

| Component | Black |
|---|---|
| Metal Chelator | 0.1 wt % |
| Biocide | 0.2 wt % |
| Buffer | 0.03 wt % |
| DOWFAX 8390 | 0.5 wt % |
| SURFYNOL | 0.4 wt % |
| EHPD | 4 wt % |
| Nitrogen Heterocyclic Ketone | 8 wt % |
| Na-PRB31 @1/10K | A = 0.12 |
| DDI Water | Balance |
| Total | 100 wt % |

DDI water is distilled deionized water.
pH adjusted with KOH for the vehicle to 7.2 to 7.3.
pH adjusted with KOH or $HNO_3$ for final ink to 7.5 to 7.6.
Absorbance (A) spectra were measured on a Hewlett-Packard 8453 spectrophotometer at 1:10,000 dilution ("1/10K").
EHPD is ethylhydroxy-propanediol The printed inks of Table I evidence no haze and have good drytime and decreased puddling.

The dry time and smudge are measured and the results are listed in Table II below. Smudge is measured by running a thumb across the printed area at some time after printing to determine whether or not the printed image was transferred or damaged.

TABLE II

Dry Time and Smudge Measurements.

| | Present Invention | | Prior Inks | |
|---|---|---|---|---|
| | Dry Time | Smudge | Dry Time | Smudge |
| Porous | instant | no | | |
| Hybrid | <2 min | no | ca. 20 min. | 2 hrs. |
| non-porous | <12 min | no | 20 min. | no |

Note:
The "prior ink" is one substantially equivalent to that disclosed and claimed in U.S. Pat. No. 5,851,273.

Example 2

An example of an ink-jet ink composition in accordance with the present invention is listed in Table III below. Table III lists the compositions for the color inks, yellow, cyan, and magenta, and for the color inks having reduced dye load, light cyan (30%) and light magenta (30%). The black ink employed contained Pacified Reactive Black 31, which had an absorbance (A) of 0.12 at 1:10,000 dilution.

TABLE III

Ink Formulation.

| Component/Color | Cyan, wt % | Magenta, wt % | Yellow, wt % | Light C, wt % | Light M, wt % |
|---|---|---|---|---|---|
| Metal Chelator | 0.1 | 0.1 | 0.1 | 0.1 | 0.1 |
| Biocide | 0.15 | 0.15 | 0.15 | 0.15 | 0.15 |
| Buffer | 0.05 | 0.05 | 0.05 | 0.05 | 0.05 |
| ZONYL FSA | 0.8 | 0.8 | 0.8 | 0.8 | 0.8 |
| DOWFAX 2A1 | 0.32 | 0.32 | 0.32 | 0.32 | 0.32 |
| SURFYNOL CT-111 | 0.16 | 0.16 | 0.16 | 0.16 | 0.16 |
| Alkane Diol | 9 | 9 | 9 | 9 | 9 |
| Nitrogen Heterocyclic Ketone | 4 | 4 | 4 | 4 | 4 |
| Na-DB199 @ 1/10K | A = 0.10 | | | 30% of C A = 0.03 | |
| Na-M377 @ 1/10K | | A = 0.079 | | | 30% of M A = 0.0237 |
| Na-AR52 @ 1/10K | | A = 0.038 | | | 30% of M A = 0.0114 |
| Na-DY132 @ 1/10K | | | A = 0.119 | | |
| DDI Water | Balance | Balance | Balance | Balance | Balance |
| Total | 100 wt % | 100 wt % | 100 wt % | 100 wt % | 100 wt % |

TABLE III

Ink Formulation.

| Component | Black, wt % |
|---|---|
| Metal Chelator | 0.1 |
| Biocide | 0.2 |
| Buffer | 0.03 |
| DOWFAX | 0.5 |
| SURFYNOL | 0.4 |
| EHPD | 4 |
| Nitrogen Heterocyclic Ketone | 8 |
| Na-PRB31 @1/10K | A = 0.12 |
| DDI Water | Balance |
| Total | 100 wt % |

DDI water is distilled deionized water.

pH adjusted with KOH for the vehicle to 7.1 to 7.2.

pH adjusted with KOH or $HNO_3$ for final ink to 7.5.

Absorbance (A) spectra were measured on a Hewlett-Packard 8453 spectrophotometer at 1:10,000 dilution ("1/10K").

EHPD is ethylhydroxy-propanediol.

The inks of Table III evidenced the same dry time and smudge results as in Table II above. The printed inks of Table III evidence no haze and decreased puddling.

Examples 3

The following black inks were formulated as indicated:

TABLE IV

| Ink # | 3A % | 3B | 3C % | 3D % |
|---|---|---|---|---|
| Nitrogen Heterocyclic Ketone | 8 | 8 | 8 | 8 |
| Fluoro Surfactant | 0.2 | — | — | — |
| Amphoric Surf. | 1 | — | — | — |
| Nonionic Surf. | 0.5 | 0.25 | 0.25 | 0.4 |
| Anionic Surf. | 0.5 | — | 1 | 0.5 |
| EHPD | — | 8 | 8 | 4 |
| 1,6 Hexanediol | 3 | — | — | — |
| Buffer | — | 0.15 | 0.15 | 0.15 |
| Biocide | 0.2 | 0.2 | 0.2 | 0.2 |
| Metal Chelator | — | 0.2 | 0.1 | 0.1 |
| PRB31 | 0.15 | 0.15 | 0.15 | 0.15 |
| PH | 7.5 | 7.5 | 7.5 | 7.5 |
| Surface tension (dynes/cm) | 22.54 | Around 30 | around 30 | around 30 |
| Kogation | 20% decrease in drop wt | No decrease | No decrease | No decrease |
| Drop velocity | Decrease | No decrease | No decrease | No decrease |

EHPD is ethyl hydroxypropanediol

PRB31-Pacicified Reactive Black 31 with Abs. @ 1/10 k dilution.

Absorbance (A) spectra were measured on a Hewlett-Packard 8453 spectrophotometer at 1:10,000 dilution ("1/10K").

When the black ink is formulated to have a surface tension of less than about 25 dynes/cm, as shown by 3A, there is a 20% decrease in drop weight which reduces print quality and the drop velocity is decreased which leads to misdirected drop placement.

INDUSTRIAL APPLICABILITY

The inks of the present invention are expected to find use in thermal ink-jet printers in combination with glossy print media.

What is claimed is:

1. An ink-jet inkset printing on porous, non-porous, and hybrid glossy print media, said ink-jet intact containing at least one color ink and at least on black ink the color ink comprising a water-soluble dye, at least one water-miscible organic co-solvent, and at least two surfactants, wherein one surfactant is a non-ionic surfactant and one is a fluoro-surfactant; and wherein said black ink is substantially free of fluoro-surfactants.

2. The ink-jet inkset of claim 1 wherein said color inks have a surface tension of from about 14 to about 24 dyne/cm and said black ink has a surface tension of from about 25 to about 43 dyne/cm.

3. The ink-jet inkset of claim 1 wherein said non-ionic surfactant in said color ink has a concentration within a range of about 0.05 to 3 wt % of said ink and wherein said fluoro-surfactant has a concentration within a range of about 0.001 to 3 wt % of said ink.

4. The ink-jet inkset of claim 1 wherein said color ink comprises three surfactants, wherein a first said surfactant is anionic, a second said surfactant is non-ionic, and a third said surfactant is either an anionic fluoro-surfactant or a non-ionic fluoro-surfactant.

5. The ink-jet inkset of claim 4 wherein said first surfactant is a diphenyl sulfonate derivative or a sulfonate, said second surfactant is an acetylenic ethoxylated diol or a polyethylene oxide either or a polypropylene oxide ether, and said third surfactant is selected from the group consisting of $(R_FCH_2CH_2O)_xPO(O^-NH_4^+)_y$ (FSP); $R_FCH_2CH_2SO_3H$ (FSJ); $R_FCH_2CH_2SO_3^-NH_4^+$ (TBS); $C_6F_{13}CH_2CH_2SO_3H$; $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_xH$ (FSO); $R_FCH_2CH_2O(CH_2CH_2O)_yH$ (FSN); wherein x and y are whole integers such that x+y=3, and wherein $R_F$ is $F(CF_2CF_2)_z$ and wherein z if from about 1 to about 7 for FSP, FSJ, and FSO, and wherein z is from about 1 to about 9 for TBS and FSA; ammonium perfluoroalkyl sulfonates; potassium fluorinated alkyl carboxylates; fluorinated alkyl polyoxyethylene othanols; fluorinated alkyl alkoxylate; and fluorinated alkyl ethers.

6. The ink-jet inkset of claim 1 wherein said water-soluble dyes comprises at least one dye selected from the group consisting of black, yellow, cyan, and magenta dyes.

7. The ink-jet inkset of claim 6 wherein said yellow dye consists essentially of Direct Yellow 132, wherein said cyan dye consists essentially of Direct Blue 299, wherein said blank dye consists essentially of Pacified Reactive Black 31, and wherein said magenta dye is selected from the group consisting of Magenta 377 and a mixture consisting essentially of Magenta 377 and Acid Red 52.

8. The ink-jet inkset of claim 1 wherein said at least one water-miscible co-solvent is selected from the group consisting of nitrogen-containing ketones; diols selected from the group consisting of ethanediols, propanediols, butanediols, pentanediols, hexanediols, heptanediols, and octanediols; $C_3$–$C_6$ alcohols and isomers thereof; glycol ethers selected from the group consisting of polyalkylene glycols, and polymeric glycols; thioglycol ethers; glycol ureas; and polyalkoxylated triols.

9. The ink-jet inkset of claim 8, wherein said at least one water-miscible organic co-solvent is selected from the group consisting of 2-pyrrolidone, N-methyl-pyrrolid-2-one (NMP), 1,3-dimethylimidazolid-2-one, octyl-pyrrolidone, 1,2-ethanediol, 1,2-propanediol, 1,3-propanediol, 2-ethyl-2-hydroxymethyl-1,3-propanediol, ethylhydroxy-propanediol, 1,2-butanediol, 1,3-butanediol, 1,4-butanediol, 1,2-pentanediol, 1,5-pentanediol, 1,2-hexanediol, 1,6-hexanediol, 2,5-hexanediol, 1,2-heptanediol, 1,7-heptanediol, 1,2-octanediol, 1,8-octanediol, propanol, butanol, pentanol, hexanol, diethylene glycol, triethylene glycol, tetraethylene glycol, dipropylene glycol, tripopylene glycol, tetrapropylene glycol, PEG 200, PEG 300, PEG 400, PPG 400, and thiodiglycol.

10. The ink-jet inkset of claim 9 wherein said at least one water-miscible organic co-solvent comprises a mixture of 2-pyrrolidone and 1,6-hexanediol.

11. The ink-jet inkset of claim 1 further comprising at least one component independently selected from the group consisting of buffers, biocides, and metal chelators.

12. An ink-jet inkset for printing on porous, non-porous, and hydrid glossy print media, wherein said inkset contains an ink-jet ink comprising (a) 0.1 to 10 wt % of at least one water-soluble dye selected from the group consisting of yellow, cyan, and magenta dyes and (b) a vehicle comprising 5 to 20 wt % of at least one water-miscible organic co-solvent, about 0.05 to 6 wt % of a surfactant mixture comprising an anionic surfactant, a non-ionic surfactant, and an anionic fluoro-surfactant; 0 to about 5 wt % of at least one component independently selected from the group consisting of buffers, biocides, and metal chelators; and the balance water; and wherein said inkset further comprises a black ink having a surface tension greater than those of the color inks.

13. The ink-jet inkset of claim 12 wherein said anionic surfactant is a diphenyl sulfonate, said non-ionic surfactant is an acetylenic ethoxylated diol or a polyethylene oxide ether or a polypropylene oxide ether, and said fluoro surfactant is selected from the group consisting of $(R_FCH_2CH_2O)_xPO(O^-NH_4^+)_y$ (FSP); $R_FCH_2CH_2SO_3H$ (FSJ); $R_FCH_2CH_2SO_3^-NH_4^+$ (TBS); $C_6F_{13}CH_2CH_2SO_3H$; $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_xH$ (FSO); $R_FCH_2CH_2O(CH_2CH_2O)_yH$ (FSN); wherein x and y are whole integers such that x+y=3, and wherein $R_F$ is $F(CF_2CF_2)_z$ and wherein z if from about 1 to about 7 for FSP, FSJ, and FSO, and wherein z is from about 1 to about 9 for TBS and FSA; ammonium perfluoroalkyl sulfonates; potassium fluorinated alkyl carboxylates; fluorinated alkyl polyoxyethylene ethanols; fluorinated alkyl alkoxylate; and fluorinated alkyl ethers.

14. The ink-jet inkset of claim 12 wherein said yellow dye consists essentially of Direct Yellow 132, wherein said cyan dye consists essentially of Direct Blue 199, wherein said black dye consists essentially of Pacified Reactive Black 31, and wherein said magenta dye comprises a mixture consisting essentially of Magenta 377 and Acid Red 52.

15. The ink-jet inkset of claim 12 wherein said at least one water-miscible co-solvent solvent is selected from the group consisting of nitrogen-containing ketones; diols selected from the group consisting of ethanediols, propanediols, butanediols, pentanediols, hexanediols, heptanediols, and octanediols; $C_3$–$C_6$ alcohols and isomers thereof; glycol ethers selected from the group consisting of polyalkylene glycols, and polymeric glycols; thioglycol ethers; glycol ureas; and polyalkoxylated triols.

16. The ink-jet inkset of claim 15, wherein said at least one water-miscible organic co-solvent is selected from the group consisting of 2-pyrrolidone, N-meth-pyrrolid-2-one (NMP), 1,3-dimethylimidazolid-2-one, octyl-pyrrolidone, 1,2-ethane-diol, 1,2-propanediol, 1,3-propanediol, 2-thyl-2-hydroxymethyl-1,3-propanediol, ethylhydroxy-propanediol, 1,2-butanediol, 1,3-butanediol, 1,4-butanediol, 1,2-pentanediol, 1,5-pentanediol, 1,2-hexanediol, 1,6-hexanediol, 2,5-hexanediol, 1,2-heptanediol, 1,7-heptanediol, 1,2-octanediol, 1,8-octanediol, propanol, butanol, pentanol, hexanol, diethylene glycol, triethylene glycol, tetraethylene glycol, dipropylene glycol, tripropylene glycol, tetrapropylene glycol, PEG 200, PEG 300, PEG 400, PPG 400, and thiodiglycol.

17. The ink-jet inkset of claim 16 wherein said at least one water-miscible organic co-solvent comprises a mixture of 2-pyrrolidone and 1,6-hexanediol.

18. A method of printing an ink-jet ink on porous, non-porous, and hybrid glossy print media, said method comprising:

(a) providing an ink-jet inkset, said ink-jet inkset comprising a black ink and a color ink which, in turn, comprises at least one water-soluble dye, a vehicle comprising at least one water-miscible organic co-solvent and water, and at least two surfactants, wherein one surfactants is a non-ionic surfactant and another surfactant is a fluoro-surfactant; wherein said black ink has a higher surface tension than those of said color inks; and (b) causing droplets of said ink-jet ink compositions to be jetted through an orifice plate onto said print media.

19. The method of claim 18 wherein said non-ionic surfactant has a concentration within a range of about 0.05 to 3 wt % of said ink and wherein said fluoro-surfactant has a concentration within a range of about 0.001 to 3 wt % of said ink.

20. The method of claim 18 comprising three surfactants, wherein a first said surfactant is anionic, a second said surfactant is non-ionic, and a third said surfactant is either an anionic fluoro-surfactant or a non-ionic fluoro-surfactant.

21. The method of claim 18 wherein said color inks have a surface tension of from about 14 to about 24 dyne/cm and said black ink has a surface tension of from about 25 to about 43 dyne/cm.

22. The method of claim 20 wherein said anionic surfactant is a diphenyl sulfonate, said non-ionic sufactant is an acetylenic ethoxylated diol or a polyethylene oxide ether or a polypropylene oxide ether, and said third surfactant is selected from the group consisting of $(R_FCH_2CH_2O)_xPO(O^-NH_4^+)_y$ (FSP); $R_FCH_2CH_2SO_2H$ (FSJ); $R_FCH_2CH_2SO_3^-NH_4^+$ (TBS); $C_6F_{13}CH_2CH_2SO_3H$; $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_xH$ (FSO); and $R_FCH_2CH_2O(CH_2CH_2O)_yH$ (FSN); wherein x and y are whole integers such that x+y=3, and wherein $R_F$ is $F(CF_2CF_2)z$ wherein z if about 1 to about 7 for FSP, FSJ, and FSO, and wherein z is from about 1 to about 9 for TBS and FSA; ammonium perfluoroalkyl sulfonates; potassium fluorinated alkyl carboxylates; fluorinated alkyl polyoxyethylene ethanols; fluorinated alkyl alkoxylate; and fluorinated alkyl ethers.

\* \* \* \* \*

UNITED STATES PATENT AND TRADEMARK OFFICE
CERTIFICATE OF CORRECTION

PATENT NO. : 6,630,017 B2
DATED : October 7, 2003
INVENTOR(S) : Ma et al.

It is certified that error appears in the above-identified patent and that said Letters Patent is hereby corrected as shown below:

Column 9,
Line 42, insert -- for -- after "inkset" and before "printing";
Line 43, delete "intact" and insert in lieu thereof -- inkset --;
Line 67, delete "either" and insert in lieu thereof -- ether --;

Column 10,
Line 12, delete "othanols" and insert in lieu thereof -- ethanols --;

Column 12,
Line 10, delete "surfactants" and insert in lieu thereof -- surfactant --;
Line 30, delete "sufactant" and insert in lieu thereof -- surfactant --.

Signed and Sealed this

Seventeenth Day of August, 2004

JON W. DUDAS
*Acting Director of the United States Patent and Trademark Office*